United States Patent [19]
Brenner et al.

[11] Patent Number: 5,901,226
[45] Date of Patent: May 4, 1999

[54] COMMUNICATION SYSTEM WITH AUTOMATIC HANDOFF

[75] Inventors: Charles Herbert Brenner, Scottsdale; Taul Eric Aragaki; Lane Evan Liley, both of Phoenix; David Moon Yee, Scottsdale; Philip John Zucarelli, Glendale, all of Ariz.

[73] Assignee: Motorola, Inc., Schaumburg, Ill.

[21] Appl. No.: 08/777,432

[22] Filed: Dec. 30, 1996

[51] Int. Cl.$^6$ ........................................... H04L 9/00
[52] U.S. Cl. .................. 380/9; 370/331; 370/332
[58] Field of Search ............................ 380/9, 34; 455/15, 455/436, 438; 375/208; 370/331, 332

[56] References Cited

U.S. PATENT DOCUMENTS 5,465,386  11/1995  Barnes et al. .............................. 455/15
5,613,196   3/1997  Barnes et al. .............................. 455/15

Primary Examiner—Salvatore Cangialosi
Attorney, Agent, or Firm—Frank J. Bogacz

[57] ABSTRACT

A method for organizing a communication system with automatic handoff. The method includes steps of: (i) sending a message from a first remote unit to a monitoring site during a specific time slot within a frame of time slots, wherein the first remote unit has a unique identification code and the message includes the unique identification code from the first remote unit; (ii) relaying the message including the identification code from the monitoring site to a central authority during a reserved time slot within the frame, the reserved time slot reserved for the relaying step; (iii) transmitting an acknowledgment message from the central authority to the monitoring site, wherein the monitoring site is determined from an updated lookup table of communications links between monitoring sites and remote units, during a time slot reserved for the acknowledgment message; and (iv) retransmitting the acknowledgment message from the monitoring site to the remote unit.

37 Claims, 6 Drawing Sheets

5,901,226

COMMUNICATION SYSTEM WITH AUTOMATIC HANDOFF

LICENSE RIGHTS

The U. S. Government has a paid-up license in this invention and the right in limited circumstances to require the patent owner to license others on reasonable terms as provided for by the terms of Contract Nos. DABT63-94-C-0088 and DAAE30-95-C-0082 awarded by the United States Army.

FIELD OF THE INVENTION

This invention relates in general to the field of automatic interrogation and response of a multiplicity of remotes on a non-interfering basis and relaying response information to higher levels with fewer nodes, until at the highest level only a single node exists. Additionally, textual information can be sent downward from a higher level to a lower level and also in a corresponding method in an upward direction.

BACKGROUND OF THE INVENTION

In tracking systems that include many portable, tracked remote units it is important coordinate the handoff between different monitors as the portable, tracked remote units move about and lose contact with one or another monitor. This problem is especially severe when communication requires line-of-sight (LOS) transmission of signals. In such systems, it is additionally desirable or essential to be able to assure that a message from a remote unit will be acknowledged by the monitoring sites in an organized fashion that assures reception of the acknowledgment by the remote unit that sent the initial message. This is particularly critical when the message that is being sent by the remote unit is an emergency (911) call which additionally provides descriptive information through a selectable canned message library or though a character-limited text message.

Thus, what is needed is a practical, economical method for providing seamless handoff between a multiplicity of monitors that are monitoring a (typically larger) number of remote units via a time division multiple access (TDMA) communications linkage. In such a system, it is particularly important to provide an acknowledging signal in an orderly fashion, especially when the initial communication is urgent.

DETAILED DESCRIPTION OF THE DRAWINGS

§ A. A first battlefield configuration.

Figure 1:
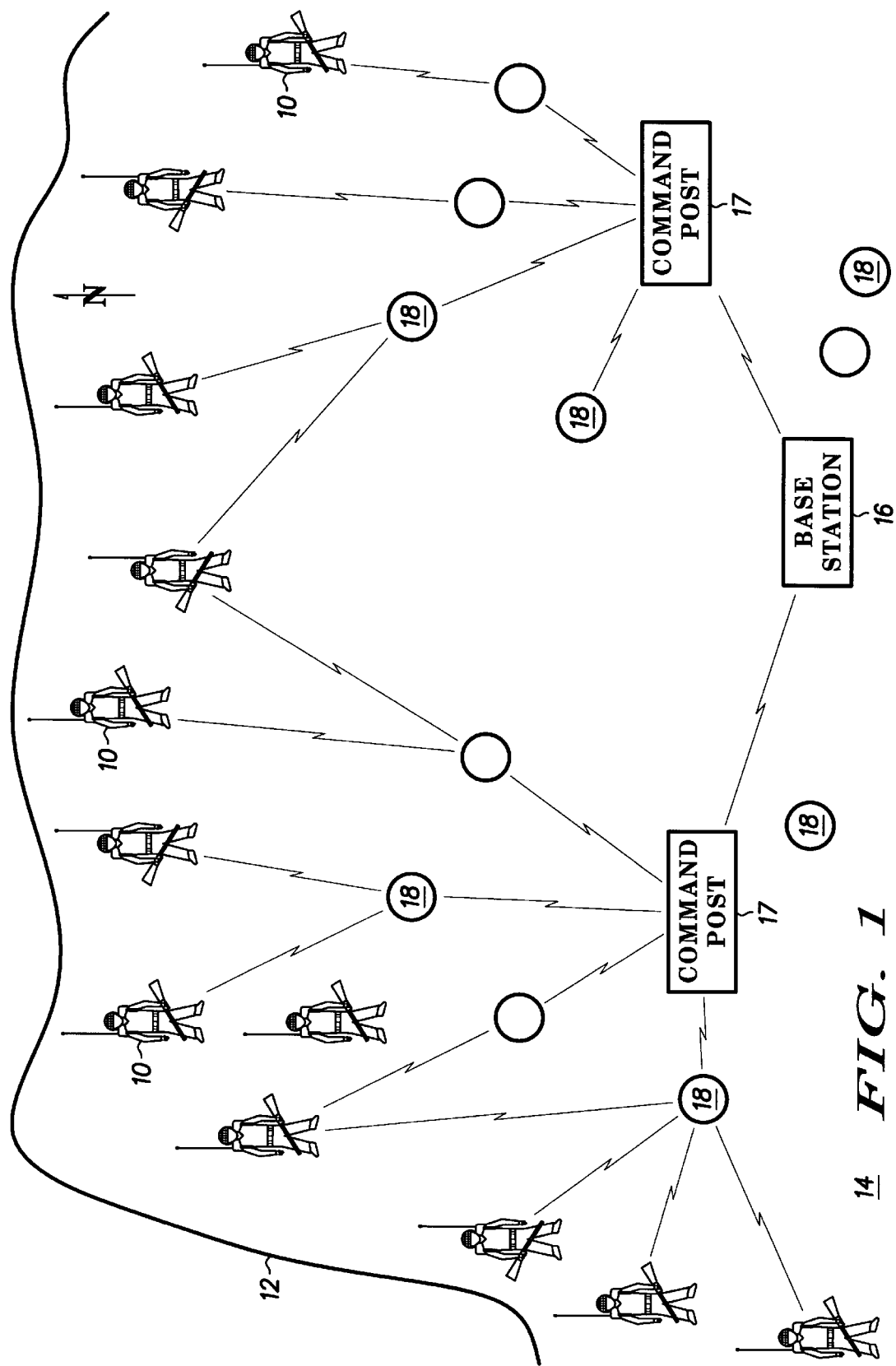
FIG. 1 is a simplified plan view of a battlefield in accordance with a first preferred embodiment of the invention.

FIG. 1 is a simplified plan view of a battlefield for deployment and operation of system 14 of the present invention. Communication system 14 described herein consists of a combined line-of-sight (LOS) and satellite communication (SATCOM) network used to keep track of up to thirty-seven movable remote units 10, operating on one frequency, by making use of a time division multiple access (TDMA) protocol which allows system 14 to operate in a half duplex mode in which only one remote unit 10 may radiate at a particular time. In other words, while point-to-point communication can occur in two directions at a given time, transmission can occur in only one direction.

Use of assigned time slots or intervals eliminates collisions between messages which may occur if two or more remote units 10 transmit at the same time when in line-of-sight of each other. System 14, using the Global Positioning System (GPS) for position determinations and time synchronization, can be used to monitor the position and status of ground, naval or air based remote units 10 (fixed or mobile). This is especially useful for early warning of: approach to a hostile border 12, approach to a "keep-out" zone which could contain enemy threats such as air-aircraft guns, land mines or missiles or as a search and rescue aid in the event of an emergency.

System 14 of the first preferred embodiment of the present invention includes observation posts 18, remote units 10, two command posts 17 and battalion command post or base station 16. In this embodiment, remote units 10 are all mobile and command posts 17 and battalion command 16 are fixed monitoring sites.

This invention allows for the expansion of the system by using a TDMA signaling protocol that is greater than sixty seconds in length. For example, a one hundred and twenty second TDMA interval provides for a network of up to seventy-four remote units.

§ B. Sixty second TDMA LOS slot assignments for a twelve second emergency call scheme with up to twenty positions per minute reporting.

Figure 2:
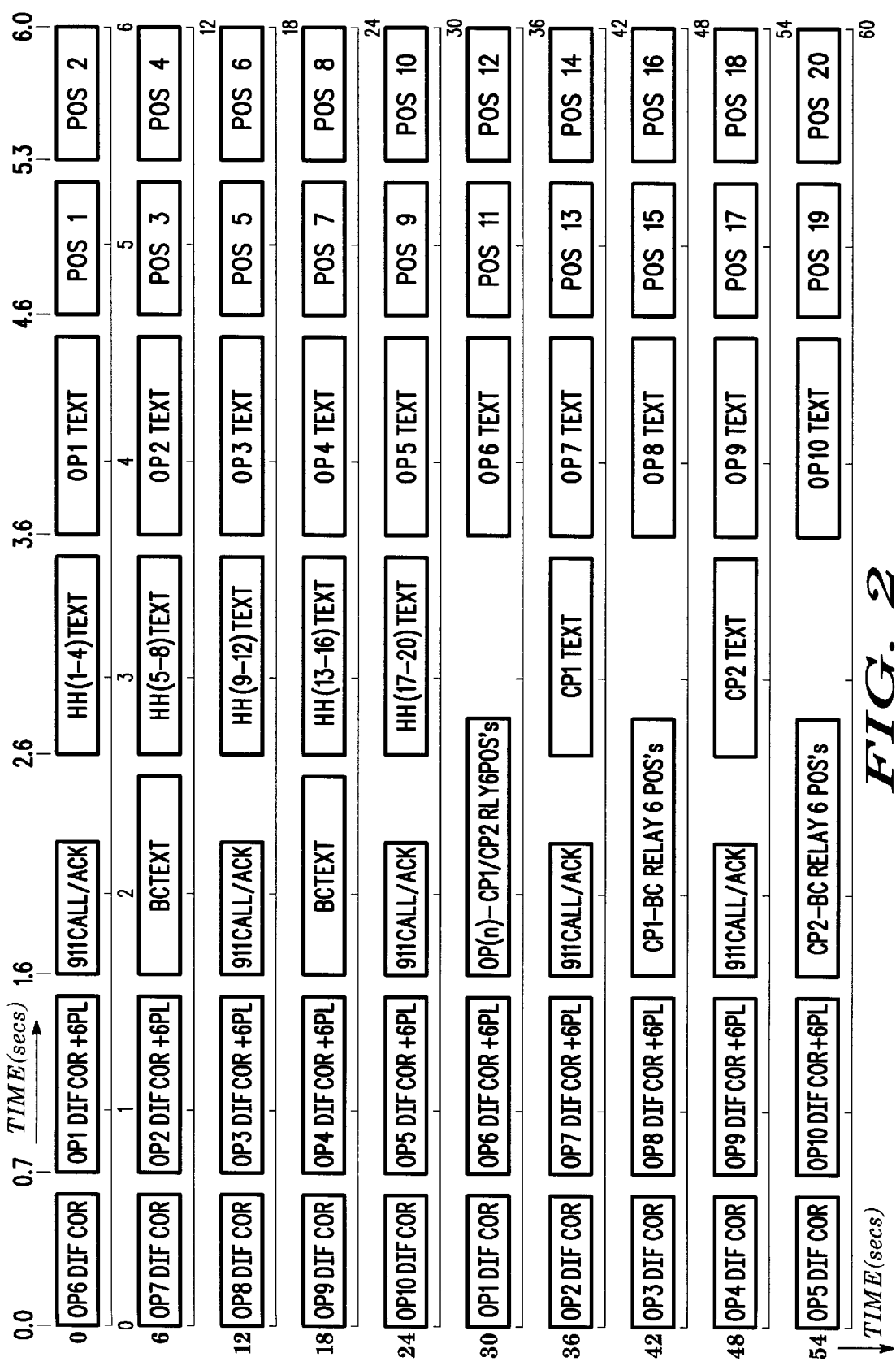
FIG. 2 is a sixty second TDMA slot assignment diagram for a twelve second emergency call scheme with twenty positions per minute reporting, in accordance with the first preferred embodiment of the present invention.

FIG. 2 is a sixty second TDMA LOS slot assignment diagram for a twelve second emergency call scheme with twenty positions per minute reporting, in accordance with the first preferred embodiment of the present invention. Slots in the first column correspond to GPS differential data that are sent from each observation post 18 to any or all remote unit(s) 10 that have an acceptable receive LOS communication link. Slots in the second column, in addition to the differential correction information, also contain up to six remote unit 10 addresses in what is called a Priority List (PL). Slots in the third column correspond to those reserved for 911 calls and acknowledgments interleaved or alternating with slots reserved for two BCTEXT slots, i.e., communications from battalion command to remote units 10 and/or fixed monitoring sites 17, 18, one slot for relay of remote position data from the nth monitoring site 18 to one or both command posts 17, and two slots for each of the two command posts 17 to relay remote positions to battalion command 16. Five time slots in the fourth column in the first thirty second sub-frame (upper half, FIG. 2) are reserved for text message transmission from the 20 remotes to one or more (if LOS communication links exist) monitoring sites (18). The second thirty second sub-frame (lower half, FIG. 2) contains two time slots reserved for communications to either battalion command post 16 (upward communications) or relaying messages from battalion command 16 or locally generated messages sent to monitoring site 18. Slots in the fifth column are reserved for text messages which may be addressed to a remote 10, another monitoring site 18 or command post 17 from fixed monitoring site 18, of which there are up to ten. Slots in the sixth and seventh columns are reserved for position reports from up to twenty different remote units 10.

§ C. Sixty second TDMA slot assignments for a six second emergency call scheme with thirty-seven positions per minute reporting.

Figure 3:
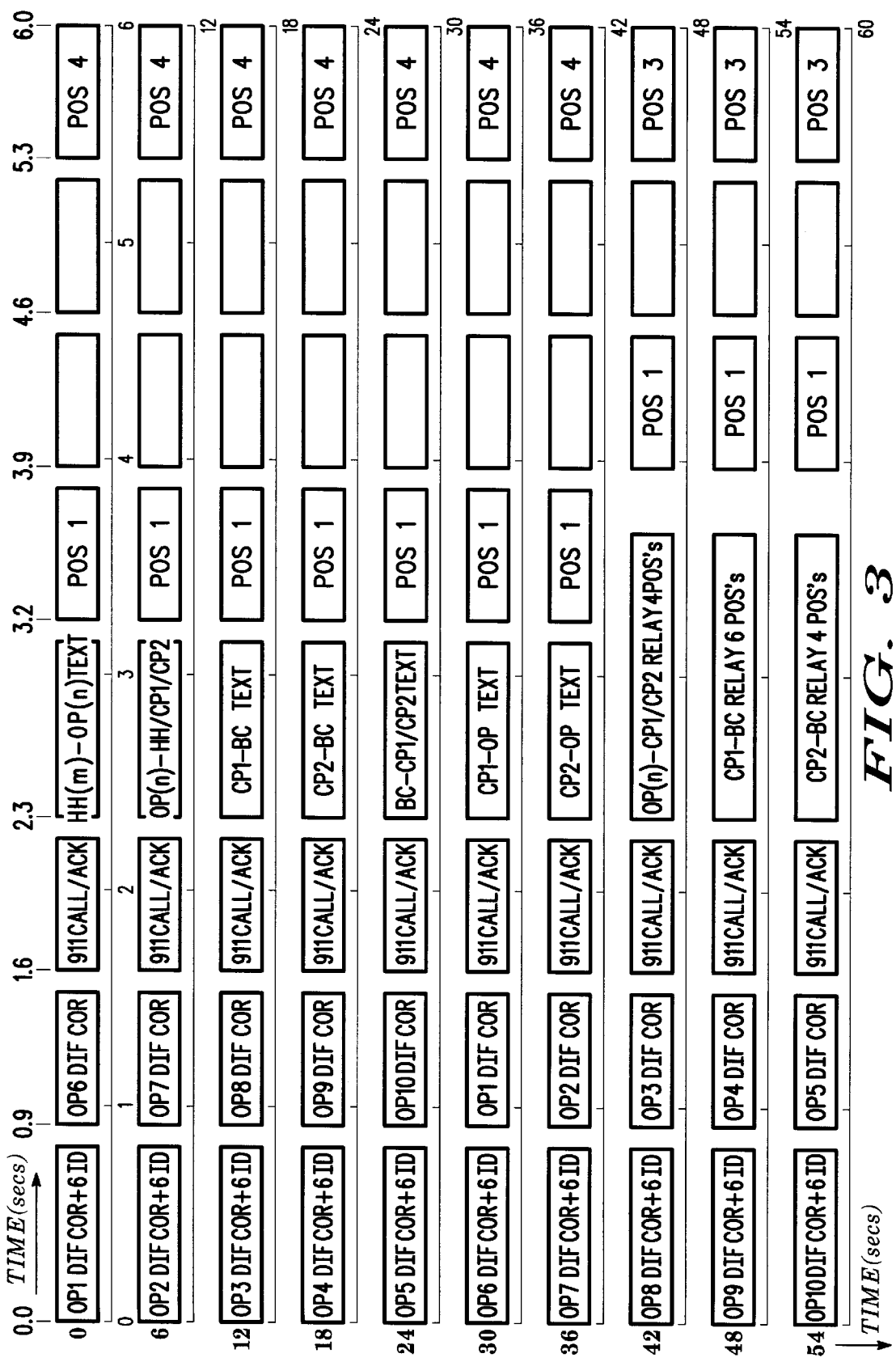
FIG. 3 is a sixty second TDMA slot assignment diagram for a six second emergency call scheme with thirty-seven positions per minute reporting, in accordance with the teachings of the present invention.

FIG. 3 is a sixty second TDMA slot assignment diagram for a six second emergency call scheme with thirty-seven positions per minute reporting, in accordance with the teachings of the present invention. Slots in the first two columns correspond to GPS differential data that are sent from each monitoring site 18 to each remote unit 10 via LOS communications, which may or may not spatially overlap with other LOS paths to other remote units 10. Slots in the first column also contain space for up to six remote unit 10 addresses or ID's but this TDMA slot configuration limits the number to a maximum of four for the first seven six second interval and three for the last three six second intervals. Slots in the third column correspond to those reserved for 911 calls and acknowledgments. Slots in the fourth column are reserved for text messages and relay of remote unit 10 position(s). The first four text intervals are used for relay of text messages from remote units 10 to monitoring site 18 to command post 17 and finally to battalion command 18. The fifth through seventh intervals are for text messages from battalion command 16 to be relayed to observation posts 18. The last three intervals, eight through ten, are used to relay the remote unit 10 positions received by the nth monitoring site 18 upward to the battalion post 16. Slots in the first seven positions of column five and all of the sixth and seventh columns are reserved for position reports from up to thirty-seven different remote units 10. Remote units 10 may be dynamically assigned to slot positions, i.e., slot assignments may be varied from one frame to the next. In this scenario, a new slot assignment list is generated and then is broadcast to the remote units 10.

§ D. Second preferred embodiment.

SYSTEM DESCRIPTION

Figure 4:
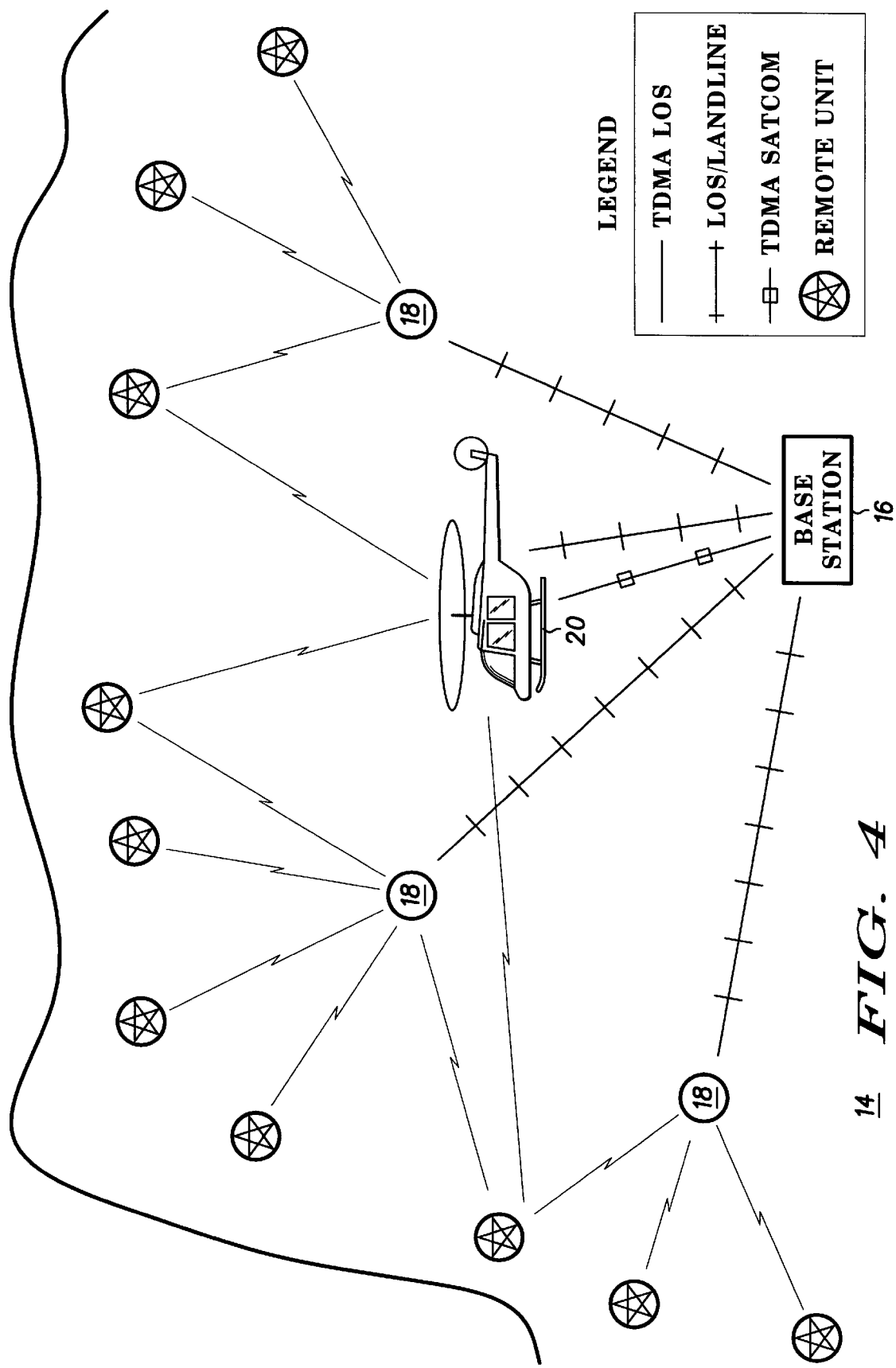
FIG. 4 is a simplified schematic diagram of a second preferred embodiment of a communication system using both line-of-sight and satellite communications links, in accordance with the teachings of the present invention in accordance with the teachings of the present invention.

A top level block diagram of system 14 in a second preferred embodiment is shown in FIG. 4. In system 14, up to forty-four remote units 10 operate on one frequency. Information is passed to and from remote units 10 to base station 16 through either a TDMA LOS UHF radio link via both fixed monitoring sites 18 and mobile monitoring sites 20, or through a TDMA LOS UHF and SATCOM radio link. In system 14, the TDMA LOS and SATCOM links operate independently of each other. Backup landline and microwave links (not illustrated) between fixed monitoring sites 18 and fixed base station 16 are also available for use in system 14. Position and normal messaging updates from each remote unit 10 occur every minute. 911 emergency calls from remote units 10 are transmitted and acknowledged six seconds later in the next, or second, priority window. GPS position accuracy is improved by the use of differential correction (pseudo range) data sent to remote units 10 from both fixed monitoring stations 18 and base station 16 once every thirty seconds.

Data are transmitted over the LOS and SATCOM network via a 1200/2400 baud minimal shift keying (MSK) modulated modem. The raw message data bits are further processed by: digital encryption standard (DES) encryption, Bose—Chadhuri—Hocquenghem (BCH) forward error correction encoding, bit interleaving and UART formatting. Then checksum bits are added.

As various remote units 10 move, some of fixed monitoring sites 18 will lose two-way communication capability (called "track") of a particular remote unit 10 due to propagation losses or physical topographical barriers and other different monitoring sites (either fixed 18 or mobile 20) must begin tracking that remote unit 10. Handover between monitoring sites 18 and/or 20 must be seamless, and, when a particular remote unit 10 issues a priority call, such as a 911 emergency call, it must be acknowledged in a timely and orderly method by at least one of monitoring sites 18 or 20.

All of remote units 10 and monitoring sites 18, 20 are configured such that they have a common TDMA protocol in which the frame time is divided into slots and transmissions by remote units 10 and monitoring sites 18 or 20 occur only during assigned time slots so that collisions between messages do not occur in a half duplex system. In order to accomplish this, all remote units 10 are given a semi-permanent unique ID number so that they may automatically transmit their position and any other information desired during their assigned time slot.

All monitoring sites 18, 20 having a LOS view and a sufficient signal-to-noise ratio (SNR) on the transmitted signal receive the position and message from remote unit 10. Monitoring sites 18, 20 can then 'relay' or forward to higher reporting levels (e.g., to base station 16) information from a selected number of remote units 10 based on a variety of criteria such as minimal distance between remote unit 10 and monitoring sites 18, 20. Additionally, when a critical message such as a 911 emergency call is sent, acknowledgment from one or more of monitoring sites 18, 20 needs to be in an orderly fashion in order to prevent collisions of the messages due to multiple acknowledgments occurring during the same time slot. Even though a critical message is sent globally, a destination ID is added whose sole purpose is identifying the monitoring site 18, 20 that will send the acknowledgment message. Remote unit 10 determines the monitoring site 18, 20 ID for acknowledgment based on selection criteria from data contained in the differential correction and positions reported list. The monitoring site 18, 20 that acknowledged the critical message was selected based on the fact that recent communications have demonstrated that that monitoring site 18, 20 and remote unit 10 have established a successful two-way communications link based on monitoring sites 18, 20 having received a position update and remote unit 10 having received a position report list that indicates its position was received. Thus only one monitoring site 18, 20 transmits an acknowledgment message.

LOS system 14 communication protocol is TDMA. This approach was selected since the system must operate as a half-duplex system in which only one user may radiate at a particular time. Use of assigned time slots or intervals eliminates collisions between messages which may occur if two or more transmitters that use LOS communication with the same relay receiver radiate during the same time slot. Time is divided into a one minute frame containing two thirty second sub-frames: zero to thirty and thirty to sixty seconds. The thirty second sub-frame composition in terms of repetition period and number of each type of message per sub-frame is given below in Table I.

TABLE I

Thirty second sub-frame composition

| Rep Period Seconds | Message Functional Description |
|---|---|
| 10 | 911 call and 911 acknowledgment |
| 30 | Site differential corrections and a Slot Assignment List, (SAL, same as priority list PL mentioned supra), with up to twenty-four ID response allocations, thirty-two bits status/control and an optional sixty character text message from base station 16 and all logged-on remote units 10. Differential correction data are unique to each of the four fixed sites 16, 18; base station 16 and fixed monitoring stations 18, while each have a common SAL, they each may transmit independent text messages. |
| 30 | Remote unit 10 text message: sixty character text message + thirty-two bits status/control. From remote unit 10 to base station 16 via one or more of the up to four relays. |
| 30 | Log on/off message: A log-on message is automatically selected from the canned message list when the radio and GPS receiver are powered up and GPS has acquired track and an operator initiated manual log-off canned message is sent from remote unit 10 to base station 16. |

Every thirty second sub-frame, message slots are allocated as shown in Table II.

TABLE II

Message slot allocations in each sub-frame

| # Msg Slots | Message Type |
|---|---|
| 4 | Differential Correction for site plus SAL with up to twenty-four IDs and text message |
| 24 | Remote unit 10 position reports |
| 3 | 911 call/911 acknowledgment |
| 1 | Remote unit 10 text |
| 1 | Log on/off |

SATCOM system 14 uses a TDMA communication protocol. Use of assigned time slots or intervals eliminates collisions between messages which may occur if two or more transmitted messages use SATCOM communication with the same relay receiver during the same time slot. Time is divided into a one thirty second frame Remote unit 10 slot interval response numbers range from one to ten. Differential corrections occur every thirty seconds and clear 911 call and acknowledgment slot intervals occur every ten seconds. The thirty second frame composition in terms of repetition period and number of each type of message per frame is given below in Table III.

TABLE III

Thirty second frame composition

| Rep Period Seconds | Message Functional Description |
|---|---|
| 10 | 911 call from helicopter 20 (mobile monitoring site 20) and 911 Acknowledgment from base station 16. |
| 30 | Site differential corrections and Slot Assignment List, SAL; with to up twenty-four ID response addresses and a sixty character text message + thirty-two bits status/control from base station 16 to all logged-on helicopters 20. |

TABLE III-continued

Thirty second frame composition

| Rep Period Seconds | Message Functional Description |
|---|---|
| 30 | Helicopter text message: sixty character text message + thirty-two bits status/control: From any helicopter 20 to base station 16. |
| 30 | Log on/off message: A log-on message is automatically selected from the canned message list when the radio and GPS receiver are powered up and GPS has acquired track while the operator initiates a manual log-off that is selected from the canned messages. Sent from helicopter 20 to base station 16. |

Every thirty second frame, message slots are allocated s shown below in Table IV.

TABLE IV

Message slot allocations in each frame

| # Msg Slots | Message Type |
|---|---|
| 1 | Base station 16 differential correction plus SAL with up to twenty-four IDs and text message |
| 10 | Helicopter 20 (mobile monitoring site 20) position reports |
| 3 | 911 call/911 acknowledgment |
| 2 | Helicopter 20 text messages |
| 1 | Helicopter 20-initiated log on (new unit ID#)/off (collisions between messages can occur if more than one unit attempts to send during the same thirty second log on/off interval) |

Los Operation

The LOS system operation is described in terms of the messages used. The time sequence is specified by the TDMA protocol timing diagram shown in FIG. 5. Each sixty second frame is composed of two thirty-second sub-frames. This defines a minimum position location report rate of once per minute.

Los TDMA Slot Assignment Diagram

Figure 5:
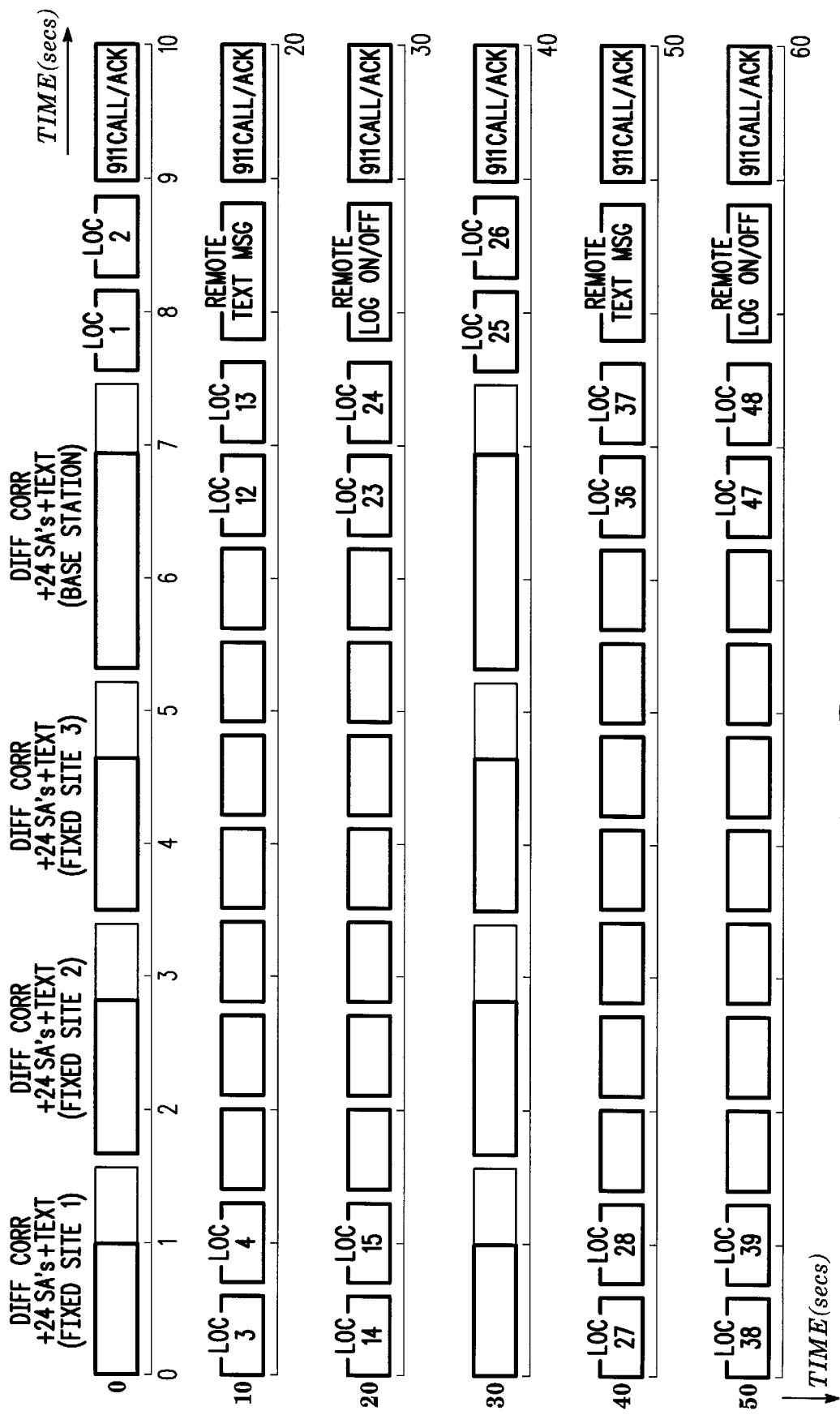
FIG. 5 is a sixty second TDMA slot assignment diagram for a ten second emergency call scheme with thirty-seven positions per minute, in accordance with the teachings of the present invention.

FIG. 5 shows the sixty second TDMA LOS slot assignment diagram. Each of the two thirty-second sub-frames has the same time slot time allocation except that remote unit 10 slot response number ranges from one to twenty-four in the first sub-frame, and from twenty-five to forty-eight in the second sub-frame, respectively. Differential corrections from all four fixed sites occur every thirty seconds and clear 911 call and acknowledgment slot intervals occur every ten seconds.

Differential Correction, Slot Assignment List (SAL) and Text

Differential Corrections

Differential correction data consist of "pseudo-range errors", measured at a fixed site with a known location by a co-located GPS receiver, that are derived based on knowing the location of the fixed site. Location of each fixed site 16, 18 can be determined based on:

1) Site survey data.
2) Self calibration—refinement of location by self measurement, typically over a period of hours. A software algorithm is required for this self-calibration procedure at a fixed site, e.g., at fixed monitoring units 18 and/or base station 16.

Slot Assignment List

The Slot Assignment List (SAL) of IDs is generated at base station 16 by the operator using a computer keyboard or mouse to make the slot ID assignment(s). System 14 provides the capability of assigning up to forty-eight position location slots every sixty second frame, i.e., once per minute.

Since the Slot Assignment List can include the same remote unit 10 ID once or more than once, remote units 10 can provide position reports at intervals less than once per minute. For example, by assigning a remote unit 10 to slot #1 and slot #25, this remote unit 10 reports its location once every thirty seconds. Once a Slot Assignment List has been acknowledged, remote unit 10 continues to report at the assigned slot until it is reset with a subsequent Slot Assignment List. The reset command is contained in the canned message portion of remote unit 10 ID.

The format of each slot assignment ID includes sixteen bits for ID address, eight bits for canned message and eight bits for Status/Control. The eight bits used for the canned message means that there can be up to 256 different canned messages.

Text and Control/Status Message

Every thirty second frame, a single sixty character text message (with thirty-two currently unused status/control bits) may be sent from base station 16 to all remote units 10. A different text message may be transmitted during the second thirty second sub-frame. Text messages are sent globally to all remote units 10.

Relay of Differential Correction/Slot Assignment List/Text

Base station 16 (via airborne relay-mobile monitoring site 20) and the three fixed monitoring sites 18 each sequentially transmit differential correction data once every thirty second frame. For the three fixed monitoring sites 18 that are coupled to base station 16 via a microwave link, only the Slot Assignment List and text message is sent as clear data without: data interleaving, BCH error correction coding, encryption and checksum. At each fixed monitoring site 18, a co-located GPS receiver unit is used to append this "clear" data to the differential corrections measured at that fixed monitoring site 18. The differential correction data and the "clear" data (SAL and text message) are formatted into a single message and then interleaved, encrypted, BCH forward error correct encoded, appended with a checksum and transmitted at the beginning of the appropriate differential correction time slot interval (first, second or third fixed monitoring site 18). Thus the SAL/text data must be received at each fixed monitoring site 18 with sufficient lead time to allow message formatting prior to the specified transmission time.

The airborne relay link is slightly different in that: 1) it uses differential correction data based on base station 16 location since the precise position of the airborne relay 20 is not known and 2) it does not re-time the signal transmission at the airborne relay 20. Thus the entire message including differential correction, SAL and text message are formed at base station 16.

Slot Assignment Acknowledgment

Each remote unit 10 acknowledges its slot assignment by automatically making a position report during its assigned slot interval. Once a remote unit 10 has received a slot interval assignment, it continues to report its location every time its allocated slot number occurs. This potentially allows other remote units 10 to continue to track a remote unit 10 that has moved out of the LOS path of airborne relay 20 and the three fixed monitoring sites 18.

911 Emergency Call and Acknowledgment and Clarifier

Clear time slot intervals that are reserved for 911 calls, call acknowledgment and call clarifier occur every ten seconds.

911 Call

A 911 call may be made by any remote unit 10. Once the emergency button is pressed, the 911 call is transmitted in the next 911 call/ack interval, which intervals occur every ten seconds, provided that remote unit 10 has been on and the GPS receiver has clock time. Once a 911 emergency call has been received at base station 16 via the mobile monitoring unit 20 and/or one to three fixed monitoring sites 18, the 911 slot interval is also used for 911 call acknowledgment.

911 Call Acknowledgment

Acknowledgment by base station 16 of a 911 call occurs in the next ten-second 911 clear interval. If the 911 call has been received via only one of the four possible monitoring sites 18, 20, then the 911 acknowledgment is returned via the same monitoring site 18, 20 during the next 911 clear slot, which occurs ten seconds later. When the 911 call was received by exactly two of the four monitoring sites 18, 20, acknowledgment is sent twice: (i) first over the closest fixed monitoring site 18 and then (ii) over the second monitoring site 18, 20 which may be either another fixed monitoring site 18 or mobile monitoring site 20. When the 911 call is received via three or four monitoring sites 18, 20, the acknowledgment is limited to two transmissions using the above criteria.

The computer software at base station 16 makes the selection of which monitoring sites 18, 20, one or two from the set of four, that the one or two acknowledgments are sent through. This is accomplished during the next one or two 911 call slot intervals which occur in the next ten or twenty seconds. The acknowledgment is repeated twice via different monitoring sites 18, 20 to provide a high assurance that the 911-calling remote unit 10 will receive an acknowledgment. The 911-calling remote unit 10 will automatically wait for twenty seconds (two 911 clear slots) to receive one or both of the 911 acknowledgments.

911 Call Clarifier

Twenty seconds after a 911 call has been transmitted, and 911-calling remote unit 10 has received either one or two 911 acknowledgments, a built-in clarifier message will automatically appear on the screen of remote unit 10. The 911 caller must use remote unit 10 to manually select one of the clarifier messages. After making the message selection and pressing the "SND" button, the clarifier message will be sent in the next 911 clear interval. The clarifier message is acknowledged in either the next one or possibly two 911 call intervals using the same strategy as was used for the 911 call acknowledgment.

Thus the process of a 911 call generates a sequence of four to six transmissions that occur during 911 clear slots. First is the 911 call, then ten seconds later the first acknowledgment, and twenty seconds later if it is transmitted is a second acknowledgment. Thirty seconds later, in the next 911 slot interval, the clarifier message is transmitted, and then, forty seconds later, the first clarifier acknowledgment is transmitted. Fifty seconds later, a second clarifier acknowledgment may be transmitted. Thus the complete 911 call sequence includes: 911 call, one or two call acknowledgments, 911 clarifier call, and one or two 911 clarifier acknowledgments and uses five to six 911 call intervals. Thus the total time required for completing a 911 call communication sequence varies between a minimum of forty seconds when 911 call is initiated just prior to the 911 clear slot interval and only one acknowledgment occurs for the 911 clarifier to a maximum of sixty seconds when the 911 call is initiated just after the 911 clear slot interval and two acknowledgments occur for the 911 clarifier.

Satcom Operation

Figure 6:
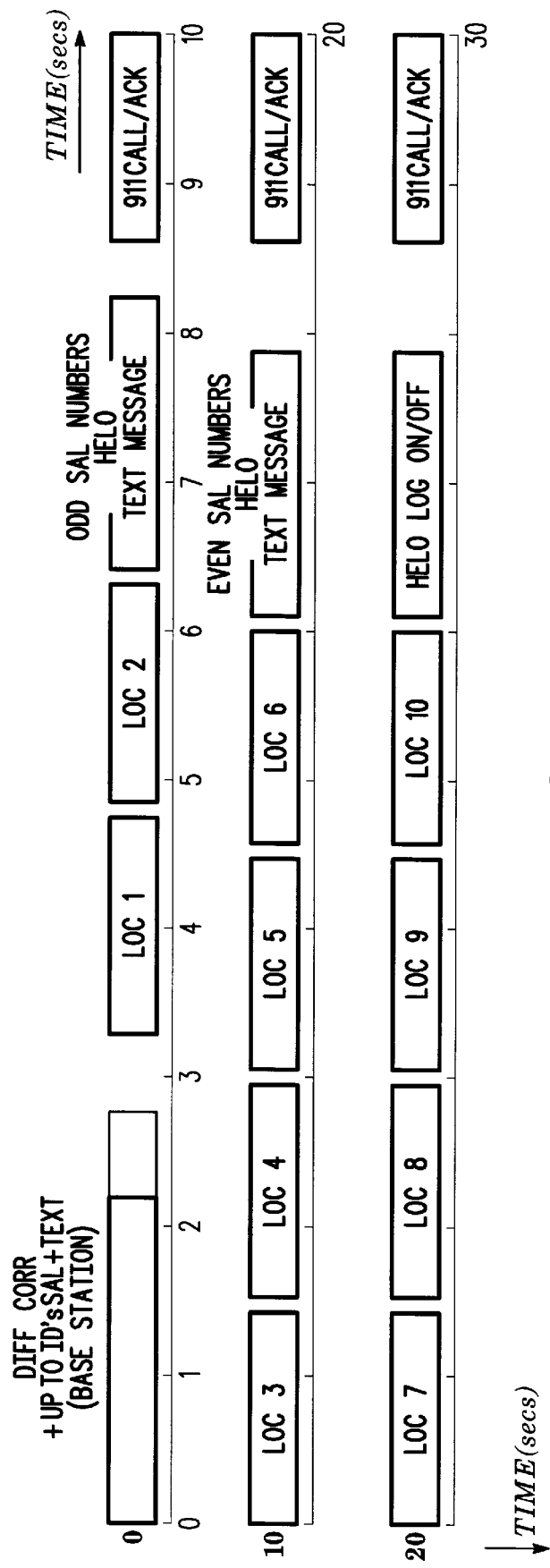
FIG. 6 is a thirty second SATCOM slot assignment diagram, in accordance with the teachings of the present invention.

SATCOM system 14 operation is described in terms of the messages used. The time sequence for the thirty second frame slot assignment is specified by the TDMA protocol timing diagram shown in FIG. 6. Remote unit 10 slot interval response numbers range from one to ten. Differential corrections occur every thirty seconds and clear 911 call and acknowledgment slot intervals occur every ten seconds. System protocol allows up to ten mobile monitoring sites 20 to be operational simultaneously, although only one is used in this application example.

Differential Correction, Slot Assignment List (SAL) and Text

Differential Corrections

Differential correction data consists of "pseudo-range errors", measured at base station 16 by a co-located GPS receiver, that are derived based on knowing the location of base station 16. Base station 16 transmits differential correction data from up to six tracked satellites every thirty seconds based on the location coordinates of base station 16 being accurately known.

Slot Assignment List

The Slot Assignment List of mobile monitoring site 20 (helicopter 20) IDs is generated at base station 16 by the operator using a computer keyboard or mouse to make helicopter 20 slot ID assignment(s). System 14 provides capability for assigning up to ten helicopter 20 position location slots every thirty second frame which is the equivalent of up to twenty helicopter 20 position reports per minute (again, only one mobile monitoring site 20—helicopter 20—is used in this example).

By using a sub-frame technique like the one used in LOS system 14 in base station 16 computer software, it is possible to provide twenty position response slot intervals every minute.

Since the Slot Assignment List can include the same helicopter 20 ID once or more than once, base station 16 operator can cause system 14 to provide a limited number of helicopters 20 with position reports at intervals less than once per thirty seconds. For example, by assigning a helicopter 20 to slot #2 and slot #7, this helicopter 20 would report its location once every fifteen seconds. If the number of helicopters 20 needing position responses during a thirty second interval is less than ten, the unused slot intervals could be used to allow location updates twice every thirty second frame.

Once a Slot Assignment List has been acknowledged, helicopter 20 continues to report at the assigned slot(s) until it is reset with a subsequent differential correction/slot assignment list/text message, which is sent every thirty seconds. The reset command is contained in the canned message portion of remote unit 10 ID.

The format of each slot assignment helicopter 20 ID includes sixteen bits for helicopter 20 ID address, eight bits for canned message and eight bits for Status/Control. The eight bits used for the canned message means that every thirty seconds, every logged-on helicopter 20 could be sent a unique or common canned message from base station 16.

Text and Control/Status Message

Once every thirty second frame, a single sixty character text message (with thirty-two currently unused status/control bits) may be sent from base station 16 to all of the logged-on helicopters 20.

Helicopter 20 Position Response

Slot Assignment (Once Every Thirty Seconds)

System 14 provides for capability of assigning ten slots to particular helicopter 20 IDs by using a thirty second. The order in which helicopter 20 ID# appears (1–10) in the SAL determines the slot number in which that helicopter 20 will report its position. It then responds or transmits its location beginning at the time defined by its assigned TDMA slot number.

Slot Assignment (Faster than Every Thirty Seconds)

From this description, it is easy to see that by repeating a particular helicopter 20 ID# in the SAL of ten slots multiple times, the position of fast moving remote unit(s) 10, e.g., like helicopter 20, could respond more often than once every thirty seconds. Multiple responses can be accomplished by assigning a particular helicopter 20 ID# to more than one slot interval during a thirty second frame. For example, responses every fifteen seconds could be achieved by assigning the same helicopter 20 ID# to slot intervals 2 and 7 in a thirty second frame. The TDMA slot diagram in FIG. 5 shows that to provide response slot assignments every fifteen seconds, the assigned slots need to be 2 and 7 and not 1 and 6 as might be expected. If slots 1 and 6 are selected, the average response interval is still every fifteen seconds, but the approximate intervals alternate between twelve and eighteen seconds.

Secondary Position Response

When any of helicopters 20 respond with their position, all other SATCOM logged-on helicopters 20 also receive the position. Thus the computer in each helicopter 20 can display the locations of all the other logged on SATCOM helicopters 20.

Helicopter Text/(Status/Control) Message

Messages from logged-on helicopters 20 to base station 16 have two text message slot intervals available every thirty seconds. The two message slot intervals are automatically assigned to all the logged-on helicopters 20 such that roughly half of helicopters 20 use each text message slot interval. The rule used is that helicopters 20 assigned odd-numbered slot intervals are always automatically assigned to text message slot interval number one. Similarly, helicopters 20 assigned even-numbered slot intervals are always automatically assigned to text message slot interval number two. Other rules are possible and may be usefully employed for splitting mobile monitoring units 20 between text message slot intervals.

911 Emergency Call and Acknowledgment

Clear time slot intervals for 911 calls occur every ten seconds. Clear 911 slot intervals are also used for acknowledgments. Acknowledgment by base station 16 of a 911 call occurs in the next ten second 911 clear interval after receipt of a 911 call. Receipt of the 911 acknowledgment by calling helicopter 20 results in a clarifier message being displayed on the laptop computer. Then the operator uses the laptop computer to select the desired clarifier canned message which will automatically be transmitted in the next 911 slot. When the operator makes the clarifier selection within less than ten seconds of the clarifier message display, the selected clarifier message is automatically transmitted in the next 911 slot, ten seconds later. Acknowledgment to the clarifier message is then automatic, occurring in the next 911 slot ten seconds later. Thus the complete 911 call/acknowledgment/clarifier/clarifier acknowledgment cycle takes thirty to forty seconds (averaging thirty-five seconds), depending on the time the 911 call was initiated with respect to the 911 call slot interval that occurs every ten seconds § E. Conclusion.

Thus, a communication system has been described which overcomes specific problems and accomplishes certain advantages relative to prior art methods and mechanisms. The improvements over known technology are significant. Several different messaging formats, all having common features, have been discussed to illustrate general advantages that these common features provide.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It is to be understood that the phraseology or terminology employed herein is for the purpose of description and not of limitation. Accordingly, the invention is intended to embrace all such alternatives, modifications, equivalents and variations as fall within the spirit and broad scope of the appended claims.

We claim:

1. A method for organizing a communication system with automatic handoff, said method comprising steps of:

sending a message from a first remote unit to a monitoring site during a specific time slot within a frame of time slots, said first remote unit having a unique identification code associated therewith, said message including said unique identification code from said first remote unit;

relaying said message including said identification code from said monitoring site to a central authority during a dynamically reserved time slot within said frame, said reserved time slot reserved for said relaying step;

transmitting an acknowledgment message from said central authority to said monitoring site, said monitoring site determined from an updated lookup table of communications links between monitoring sites and remote units, during a time slot reserved for said acknowledgment message; and retransmitting said acknowledgment message from said monitoring site to said remote unit.

2. A method as claimed in claim 1, further comprising a step of sending differential global positioning data from a monitoring station to said remote unit during a specific time slot within a frame, each said specific time slot reserved for communication with a corresponding specific one of said remote units.

3. A method as claimed in claim 1, further comprising steps of:

receiving said differential global positioning data by each of said remote units during said specific time slot set aside for each of said specific remote units; and decrypting said differential global positioning data by each of said remote units.

4. A method as claimed in claim 1, wherein said step of sending a differential global positioning data from a monitoring station to said remote unit includes substeps of:

i) interleaving data to provide interleaved data; and ii) encrypting said interleaved data to provide encrypted data.

5. A method as claimed in claim 4, wherein said step of sending a differential global positioning data from a monitoring station to said remote unit includes substeps of:

iii) Bose—Chadhuri—Hocquenghem (BCH) forward error correction encoding said encrypted data to provide BCH encoded data; and iv) appending a checksum to said BCH encoded data.

6. A method as claimed in claim 5, wherein said substep ii) includes a substep ii)a) of encrypting said data with a data encryption standard encryption engine.

7. A method as claimed in claim 1, further comprising a step of synchronizing a time base in said remote unit using ephemeris data derived from said differential global positioning data.

8. A method as claimed in claim 1, further comprising a step of sending a critical message globally, said critical message including a destination ID identifying a monitoring site that will send an acknowledgment message.

9. A method as claimed in claim 8, further comprising a step of determining that monitoring site ID based on selection criteria from data contained in a differential correction and positions reported list stored in said remote unit.

10. A method for organizing a communication system with automatic handoff, said communication system including a plurality of remote units, a plurality of monitoring sites, and a central authority, said method comprising steps of:

sending a message from a first remote unit to a first monitoring site during a specific time slot within a frame of time slots, said first remote unit having a unique identification code associated therewith, said message including said unique identification code of said first remote unit; and receiving an acknowledgment message from said central authority via a second monitoring site, said second monitoring site determined from an updated lookup table of communications links between monitoring sites and remote units, during a time slot reserved for said acknowledgment message.

11. A method as claimed in claim 10, further comprising a step of receiving differential global positioning data from a monitoring station by said remote unit during a specific time slot within a frame, each said specific time slot reserved for communication with a corresponding specific one of said remote units.

12. A method as claimed in claim 10, further comprising a step of decrypting said differential global positioning data by each of said remote units during said specific time slot set aside for each of said specific remote units.

13. A method as claimed in claim 10, wherein said step of sending a differential global positioning data from a monitoring station to said remote unit includes substeps of:
   i) interleaving data to provide interleaved data; and
   ii) encrypting said interleaved data to provide encrypted data.

14. A method as claimed in claim 13, wherein said step of sending a differential global positioning data from a monitoring station to said remote unit includes substeps of:
   iii) Bose—Chadhuri—Hocquenghem (BCH) forward error correction encoding said encrypted data to provide BCH encoded data; and
   iv) appending a checksum to said BCH encoded data.

15. A method as claimed in claim 14, wherein said substep ii) includes a substep ii)a) of encrypting said data with a data encryption standard encryption engine.

16. A method as claimed in claim 10, further comprising a step of synchronizing a time base in said remote unit using ephemeris data derived from said differential global positioning data.

17. A method as claimed in claim 10, wherein said step of sending a message includes sending a critical message, said critical message including a destination ID identifying said second monitoring site.

18. A method as claimed in claim 17, wherein said step of sending a critical message includes a step of determining said destination ID using data contained in a differential correction and positions reported list stored in said remote unit.

19. A method as claimed in claim 10, wherein said first monitoring site and said second monitoring site are the same entity.

20. A method for transferring messages in a wireless communication system, said wireless communication system having a central authority, a plurality of monitoring stations, and a plurality of remote units, wherein said plurality of monitoring stations acts as an intermediary communications level between said central authority and said plurality of remote units for supporting wireless communications therebetween, said method comprising the steps of:
   determining that a message needs to be delivered to the central authority from a first remote unit in the plurality of remote units;
   selecting a first monitoring station from the plurality of monitoring stations for use in delivering an acknowledgment signal from the central authority to said first remote unit, said acknowledgment signal for acknowledging receipt of said message by said central authority;
   first transmitting said message from said first remote unit to a second monitoring station in the plurality of monitoring stations, said message including an identifier identifying said first monitoring station;
   first relaying said message from said second monitoring station to said central authority;
   second transmitting said acknowledgment signal from said central authority to said first monitoring station using said identifier; and
   second relaying said acknowledgment signal from said first monitoring station to said first remote unit.

21. The method, as claimed in claim 20, wherein:
said step of selecting is performed at said first remote unit.

22. The method, as claimed in claim 20, wherein:
said step of selecting includes selecting said first monitoring station based on a priori information about communication link quality between said first remote unit and said plurality of monitoring stations.

23. The method, as claimed in claim 22, comprising:
periodically transmitting location messages from each of said plurality of remote units, said location messages each including a current location of a corresponding remote unit and an identifier uniquely identifying said corresponding remote unit; and
receiving said location messages at said plurality of monitoring stations, wherein each of said plurality of monitoring stations receives location messages from remote units that are within communications range of said monitoring station, said plurality of monitoring stations each maintaining a position report list listing positions of selected remote units in the plurality of remote units.

24. The method, as claimed in claim 23, comprising:
periodically transmitting position report lists from each of said plurality of monitoring stations;
receiving position report lists from said plurality of monitoring stations at said plurality of remote units, wherein each of said plurality of remote units receives a position report list from monitoring stations that are within communications range of said remote unit; and
determining, at said first remote unit, said a priori information about communication link quality based on one or more position report lists received by said first remote unit.

25. The method, as claimed in claim 24, wherein:
said step of determining said a priori information includes checking said one or more position report lists received by said first remote unit to determine whether said one or more position report lists include accurate position information for said first remote unit.

26. The method, as claimed in claim 23, wherein:
said step of periodically transmitting location messages includes transmitting a location message from each of said plurality of remote units during a predetermined time slot in a frame.

27. The method, as claimed in claim 24, wherein:
said step of periodically transmitting said position report list includes transmitting a position report list during a predetermined time slot in a frame.

28. The method, as claimed in claim 20, wherein:
said first monitoring station and said second monitoring station are the same unit.

29. The method, as claimed in claim 20, wherein:
said step of second transmitting said acknowledgment signal includes broadcasting said acknowledgment signal with an identifier identifying said first monitoring station; and
said step of second relaying includes receiving said acknowledgment signal at said first monitoring station, reading said identifier and determining whether it identifies said first monitoring station, and relaying said acknowledgment signal only when said identifier identifies said first monitoring station.

30. The method, as claimed in claim 20, wherein:
said steps of first transmitting, first relaying, second transmitting, and second relaying are all performed using the same frequency.

31. A method for coordinating message/acknowledgment delivery in a wireless communication system having a plurality of remote units, a plurality of monitoring stations, and a central authority as wireless communication nodes, wherein the plurality of monitoring stations acts as an intermediary communications level between the plurality of remote units and the central authority, said method comprising the steps of:

determining that a message needs to be delivered from a first remote unit in the plurality of remote units to the central authority;

broadcasting said message from said first remote unit;

receiving said message broadcast from said first remote unit at at least one monitoring station in the plurality of monitoring stations;

relaying said message from said at least one monitoring station to said central authority; and when said at least one monitoring station includes multiple monitoring stations:

selecting, based on predetermined criteria, a first monitoring station from said multiple monitoring stations for use in delivering an acknowledgment signal from said central authority to said first remote unit, said acknowledgment signal indicating receipt of said message at said central authority;

first transmitting said acknowledgment signal from said central authority to said first monitoring station; and first relaying said acknowledgment signal from said first monitoring station to said first remote unit.

32. The method, as claimed in claim 31, wherein:

said step of selecting includes choosing a first monitoring station that is physically closest to said first remote unit.

33. The method, as claimed in claim 32, wherein:

said step of selecting includes maintaining a list of current locations for said plurality of remote units, wherein said list of current locations is used to choose a first monitoring station that is physically closest to said first remote unit.

34. The method, as claimed in claim 31, further comprising the step of:

when said multiple monitoring stations includes at least one stationary monitoring station and at least one mobile monitoring station, selecting a first monitoring station from said at least one stationary monitoring station that is physically closest to said first remote unit.

35. The method, as claimed in claim 31, wherein:

said step of selecting includes selecting a second monitoring station from said multiple monitoring stations for use in delivering said acknowledgment signal from said central authority to said first remote unit, said second monitoring station being different from said first monitoring station;

said method further comprising the steps of:

second transmitting, after said step of first transmitting, said acknowledgment signal from said central authority to said second monitoring station; and second relaying said acknowledgment signal from said second monitoring station to said first remote unit.

36. The method, as claimed in claim 31, further comprising:

establishing a plurality of time slots for use in performing wireless communications in said wireless communication system, said plurality of time slots including a subgroup of recurring time slots for use in message delivery/acknowledgment between the plurality of remote units and the central authority, wherein said step of broadcasting occurs during a first time slot in said subgroup of recurring time slots, said step of first transmitting occurs during a second time slot in said subgroup of recurring time slots that is after said first time slot, and said step of second transmitting occurs during a third time slot in said subgroup of recurring time slots after said second time slot.

37. The method, as claimed in claim 31, wherein:

said wireless communication system is a single frequency system.

\* \* \* \* \*